United States Patent [19]

Keiner

[11] 3,800,166

[45] Mar. 26, 1974

[54] HIGH VOLTAGE SOLID STATE SWITCHING TECHNIQUES

[75] Inventor: Frederick G. Keiner, Scottsdale, Ariz.

[73] Assignee: Motorola, Inc., Franklin Park, Ill.

[22] Filed: July 3, 1972

[21] Appl. No.: 268,498

[52] U.S. Cl. .................. 307/241, 307/254, 307/260, 307/296

[51] Int. Cl. .................. H03k 17/00

[58] Field of Search ........... 307/254, 293, 246, 241, 307/260, 296; 330/18

[56] References Cited

UNITED STATES PATENTS

| | | | |
|---|---|---|---|
| 3,275,850 | 9/1966 | Arseneau | 307/293 |
| 3,496,385 | 2/1970 | Hopkins | 307/293 X |
| 3,007,061 | 10/1961 | Gindi | 307/254 |
| 3,441,875 | 4/1969 | Shon | 307/254 X |
| 3,267,290 | 8/1966 | Diebold | 367/252 N |

*Primary Examiner*—Rudolph V. Rolinec
*Assistant Examiner*—B. P. Davis
*Attorney, Agent, or Firm*—Vincent J. Rauner; Victor Myer

[57] ABSTRACT

A high voltage solid state switching technique and apparatus are disclosed for supplying an essentially capacitive load which may operate at several different voltage levels. The technique provides rapid switching from low levels to high levels and vice versa. Switch sections are connected in various combinations with one or more power supplies to achieve the different levels. The voltage between levels is greater than the blocking voltage of the individual transistors used so that several transistors are stacked in each switch section to provide the necessary standoff voltage capability.

The transistors in each switch section are turned on or off together and when turned on a momentary hard drive is provided so that the capacitance of the load may be rapidly charged or discharged depending upon whether the voltage is being raised or lowered. After a predetermined time the hard drive is discontinued and a regular drive is maintained.

Whenever a voltage level is changed there is momentary turn off of all of the transistors before any are turned on to allow the stored charge in each transistor to decay. Then, when certain switch sections are turned on there are no short circuits of the power supplies due to the delayed turn off of other switch sections.

24 Claims, 4 Drawing Figures

HIGH VOLTAGE SOLID STATE SWITCHING TECHNIQUES

BACKGROUND OF THE INVENTION

This invention relates to high voltage switching techniques utilizing solid state devices such as transistors, more particularly to such techniques wherein the high voltage may be switched up or down in very short time intervals to meet the requirements of a relatively large capacitive load, and it is an object of the invention to provide improved techniques and apparatus of this nature.

It is known, broadly, how to stack a series of relatively low voltage transistors and control them for providing relatively high voltage stand off and switching, with transistor drive power and control being obtained through isolating transformers. In ordinary applications where the switching times are relatively long and where the voltage and current requirements imposed by a relatively small capacitive load are not too great, the known techniques may suffice. Further problems are imposed by the need to switch voltages up or down from various levels of voltage. When switching capability which will give switching times of the order of 10 microseconds per 6 kilovolts (KV.) to a 1,000 pico farad (PF.) or greater load is needed, the known techniques fail because of slowness of operation and other reasons. Accordingly, it is a further object of the invention to provide high voltage solid state switching techniques and structures of the nature indicated which will obviate the limitations of the prior art.

It is a further object of the invention to provide high voltage solid state switching techniques and structures of the nature indicated which are of high reliability, smaller size, higher speed, and higher efficiency.

One area of application where the subject invention finds usefulness is that of cathode ray tube (CRT) color displays. In one form of such a display, characters appear on the tube screen in different colors depending on the voltage applied to the tube screen (anode). The different colored phosphors may be disposed in layers on a penetration type CRT screen and the voltage level determines the depth to which the electron beam penetrates; hence the color is determined by the voltage. The voltage changes to produce different colors may be either up or down, and the problem in each case is to charge or discharge, at a high rate, the large capacitance represented by the tube anode. The time for switching from one voltage level to another is limited because characters of various colors must be formed quickly to accommodate all of the data intended to be displayed. The voltages required are high, the space available for switching is often low, and the power utilized for switching should be low. All of these restrictions impose severe problems which the subject invention meets. Other objects and advantages will become apparent as the description proceeds.

BRIEF DESCRIPTION OF THE INVENTION

In carrying out the invention in one form, there is provided, in an on-off switching circuit for a plurality of series connected switching transistors connecting an essentially capacitive load to a voltage source having a voltage higher than the blocking voltage of each of said plurality of switching transistors, each of said switching transistors having an emitter, a collector, and a base, control means for said plurality of switching transistors comprising: first means including timing means individual to each of said switching transistors for simultaneously providing a high bias current to the base electrode of each of said transistors for a predetermined time after a turn-on signal while charging said capacitive load, and for simultaneously providing a regular bias current to the base electrode of each of said switching transistors after said predetermined time, second means individual to each of said switching transistors and independent of said first means for controlling said first means, and third means individual to each of said switching transistors and independent of said first and said second means for simultaneously providing, after a signal therefor, an off voltage to the base of each of said switching transistors.

In carrying out the invention in another form, there is provided a transistor switch structure comprising a plurality of series connected switching transistors for connecting an essentially capacitive load to a current source whose voltage exceeds the blocking voltage of each of said plurality of switching transistors, each of said switching transistors having an emitter, a collector, and a base; first means including timing means individual to each of said switching transistors for simultaneously providing a high bias current to the base electrode of each of said switching transistors for a predetermined time after a turn-on signal, while charging said capacitive load and a regular bias current to the base electrode of each of said switching transistors after said predetermined time; said first means comprises for each switching transistor, a capacitor maintainable in a predetermined state of charge, a first source of current for charging said capacitor, a second transistor whose emitter-collector circuit is connected between the capacitor and the base of the switching transistor, the base of said second transistor receiving said turn-on signal and being responsive to said timing means, a third transistor whose emitter-collector circuit is connected between one terminal of said source of current and the base of said switching transistor and whose base receives said turn-on signal, and a relatively high resistance means connected in the emitter-collector circuit of said third transistor; second means individual to each of said switching transistors and independent of said first means for controlling said first means, said second means comprises for each of said switching transistors respectively, a second source of current; the base of said second transistor being connected to said second source of current for providing a turn-on signal for said second transistor, the base of said third transistor being connected to said second source of current for providing turn-on signal therefor, a relatively high impedance connected in the emitter-collector circuit of said third transistor, timing means connected to the base of said second transistor; and third means individual to each of said switching transistors and independent of said first and said second means for simultaneously providing, after a signal therefor, an off voltage to the base of each of said switching transistors, said third means comprises, for each of said switching transistors, respectively, a third source of current, and a fourth transistor whose emitter-collector circuit is connected in a relatively low impedance circuit with the base of said switching transistor and one terminal of said third source of current, and whose base is connected to the other terminal of said third source of current; each of the switching transistors of the first means, second means and third means include separate transformers each having a primary winding and one or more secondary windings; and the first, second and third current sources each include a rectifier connected, respectively, to the secondary windings of said transformers.

In carrying out the invention in still another form, there is provided a switching circuit for connecting and disconnecting one or more voltage sources to an essentially capacitive load comprising a series of transistor switch sections, the switching transistors of which have a blocking voltage less than the voltage of one of said voltage sources, first control means for selecting a predetermined number of switch sections of said series and closing the same to effect connecting the correlated number of current sources through said switch sections to said load, and further control means cooperating with said first control means for opening the remaining ones of said switch sections prior to said closing.

DESCRIPTION OF THE PREFERRED EMBODIMENTS

Figure 1:
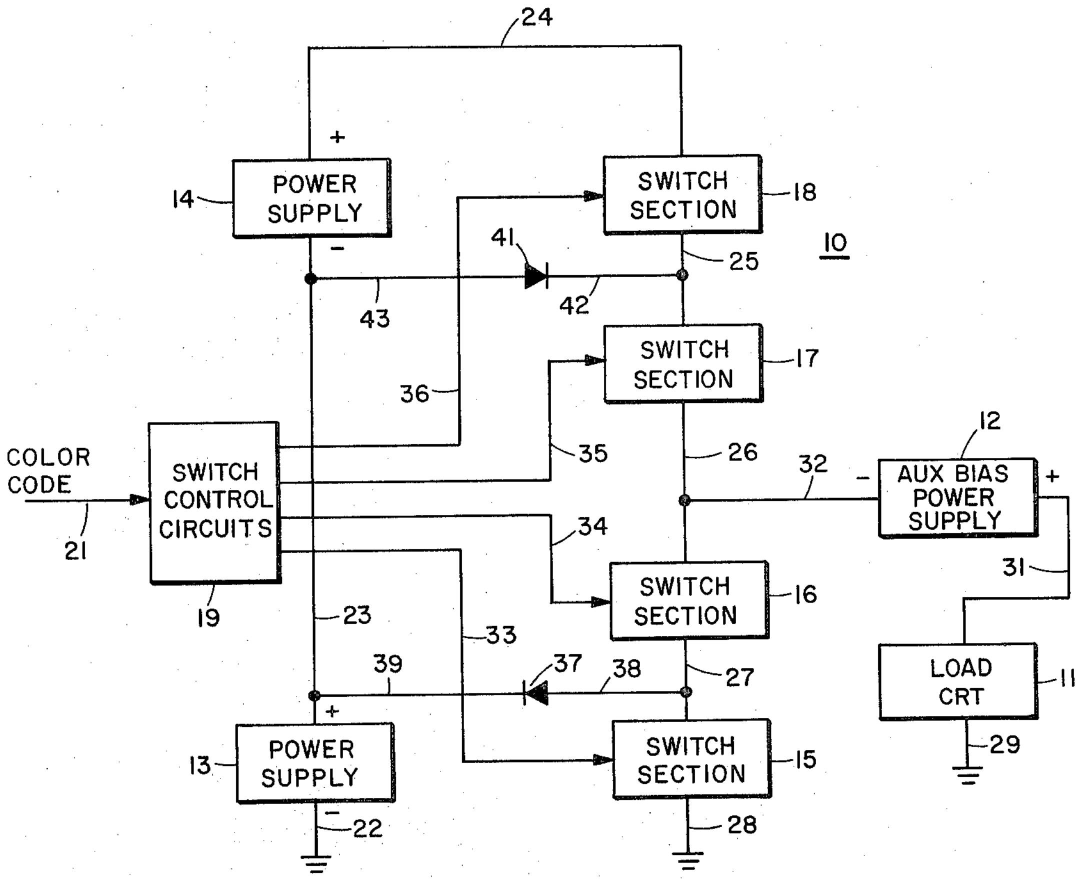
FIG. 1 is a block diagram illustrating a system according to one form of the invention.
Figure 1A:
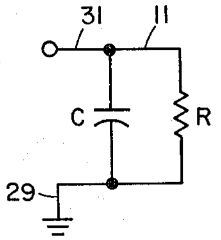
FIG. 1A is a schematic diagram of one component of FIG. 1.

Referring to the drawings there is shown in FIG. 1 a system 10 according to the invention wherein a load 11 may be supplied with the one of three different voltage levels through combinations of power supplies 12, 13 and 14 by means of four high voltage solid state switch sections designated by the reference characters 15, 16, 17 and 18. The switch sections 15, 16, 17 and 18 are identical with each other and switch section 17 is shown in greater detail in FIG. 2. Control for operation of the switch sections 15–18 is provided by switch control circuits designated by the reference character 19 which is shown in greater detail in FIG. 3.

The load 11 may be a color cathode ray tube (CRT) on whose screen characters will appear in different colors depending on the voltage applied thereto. In the circuit shown in FIG. 1 three voltage levels are possible, that of auxiliary bias power supply 12 above, that of power supply 12 and power supply 13 in series, and that of power supplies 12, 13 and 14 in series, under the appropriate control of the various solid state switches and switch control circuit 19. Three colors, accordingly, one for each voltage level, are available on the screen of the CRT. The color to be displayed and thus the voltage to be applied to the CRT are determined ultimately by a color code over conductor 21. The color code may be of any well-known form such for example as a binary code in which certain combinations of signals represent the colors to be displayed.

In one structure, according to the invention, the voltage levels were 6 KV., 9 KV., and 12 KV., the power supply 12 being 6 KV. and each of the power supplies 1 and 2 being 3 KV. each. Hence, each of the switch sections 15, 16, 17 and 18 must be capable of withstanding 3 KV. so that the series combination of two of them will withstand 6 KV.

As shown, the switches 15, 16, 17 and 18 are disposed in a series circuit with power supplies 13 and 14 as follows: from ground through conductor 22, power supply 13, conductor 23, power supply 14, conductor 24, switch section 18, conductor 25, switch section 17, conductor 26, switch section 16, conductor 27, switch section 15, and conductor 28 to ground. For this to avoid being a short circuit, two of switch sections 15, 16, 17 and 18 are open. The load 11 is connected into the circuit as follows: from ground through conductor 29, load 11, conductor 31, power supply 12, and conductor 32 to conductor 26, and then, depending on the required voltage level, to one of switch sections 16 or 17. If low voltage level, then through conductor 26, switch section 16, conductor 27, switch section 15, and conductor 28 to ground. If high level, then through conductor 26, switch section 17, conductor 25, switch section 18, conductor 24, power supply 14, conductor 23, power supply 13 and conductor 22 to ground. The control of switch sections 15, 16, 17 and 18 is carried out through control conductors represented by the reference characters 33, 34, 35 and 36, respectively, from the switch control circuits 19. A diode 37 is connected between conductors 27 and 23 by means of conductors 38 and 39 and a diode 41 is connected between conductors 25 and 23 by means of conductors 42 and 43 for a purpose to be described subsequently in this specification.

The low level of voltage supplied to load 11 occurs when the auxiliary bias power supply 12 only is connected thereto which occurs when the switch sections 15 and 16 are on (closed) and the switch sections 17 and 18 are off (open). For the intermediate voltage level applied to load 11, the auxiliary bias power supply 12 and the power supply 13 are connected in series for 9 KV., with the switch sections 15 and 18 off and the switch sections 16 and 17 on. The circuit for the intermediate condition may be traced as follows: from ground 22 through power supply 13, conductor 23, conductor 43, diode 41, conductor 42, conductor 25, switch section 17, conductor 26, conductor 32, auxiliary bias power supply 12, conductor 31, load 11 and conductor 29 to ground. While the switch section 16 is on under this condition for a purpose that will be indicated subsequently in this specification, no current flows therethrough because of the polarity of diode 37 and the fact that switch section 15 is off. The high level of voltage is applied to load 11 by connecting power supplies 12, 13 and 14 in series through the circuit extending from ground through conductor 29, load 11, conductor 31, power supply 12, conductors 32 and 26, switch section 17, conductor 25, switch section 18, conductor 24, power supply 14, conductor 23, power supply 13 and conductor 22, to ground. For this condition the switch sections 15 and 16 are off and the switch sections 17 and 18 are on.

The load 11 which typically may be the anode circuit of a cathode ray tube consists largely of a capacitor C which typically may have a value of 1,000 to 2,000 pico farads. While some resistance R is associated with the capacitive load, it is essentially negligible in the present application.

When the system is first energized, the voltage on load 11 is the low state, that of auxiliary bias power supply 12, namely 6 KV. For this condition switch sections 15 and 16 are on. When it is desired to switch up to 9 KV. by connecting in the power supply 13, switch sections 15 and 18 are off and switch sections 16 and 17 are on, but the pull up in voltage requires that the load capacitor C be charged up from 6 KV. to 9 KV. before characters will appear on the CRT in the intermediate color. Reduction of time required to charge, or discharge, the capacitor C is one of the solutions presented by the invention. Similarly when the voltage is intended to be changed from 9 KV. to 12 KV. as by opening switch sections 15 and 16 and closing switch sections 17 and 18, the capacitor C must be charged from 9 KV. to 12 KV. giving rise to the same problem as the change from 6 KV. to 9 KV. Correspondingly, when it is desired to change from 12 KV. to 9 KV. or 6 KV., the capacitor C has a charge corresponding to these voltages thereon and must be discharged or pulled down to the lower voltage before characters will appear on the CRT in the appropriate color.

More or fewer voltage levels and switching sections may, of course, be used as directed.

Additional description of the operation of the circuit of FIG. 1 will be given following the description of operation of an individual switch section, for example switch section 17, shown in FIG. 2 and the control circuit 19 shown in FIG. 3.

Figure 2:
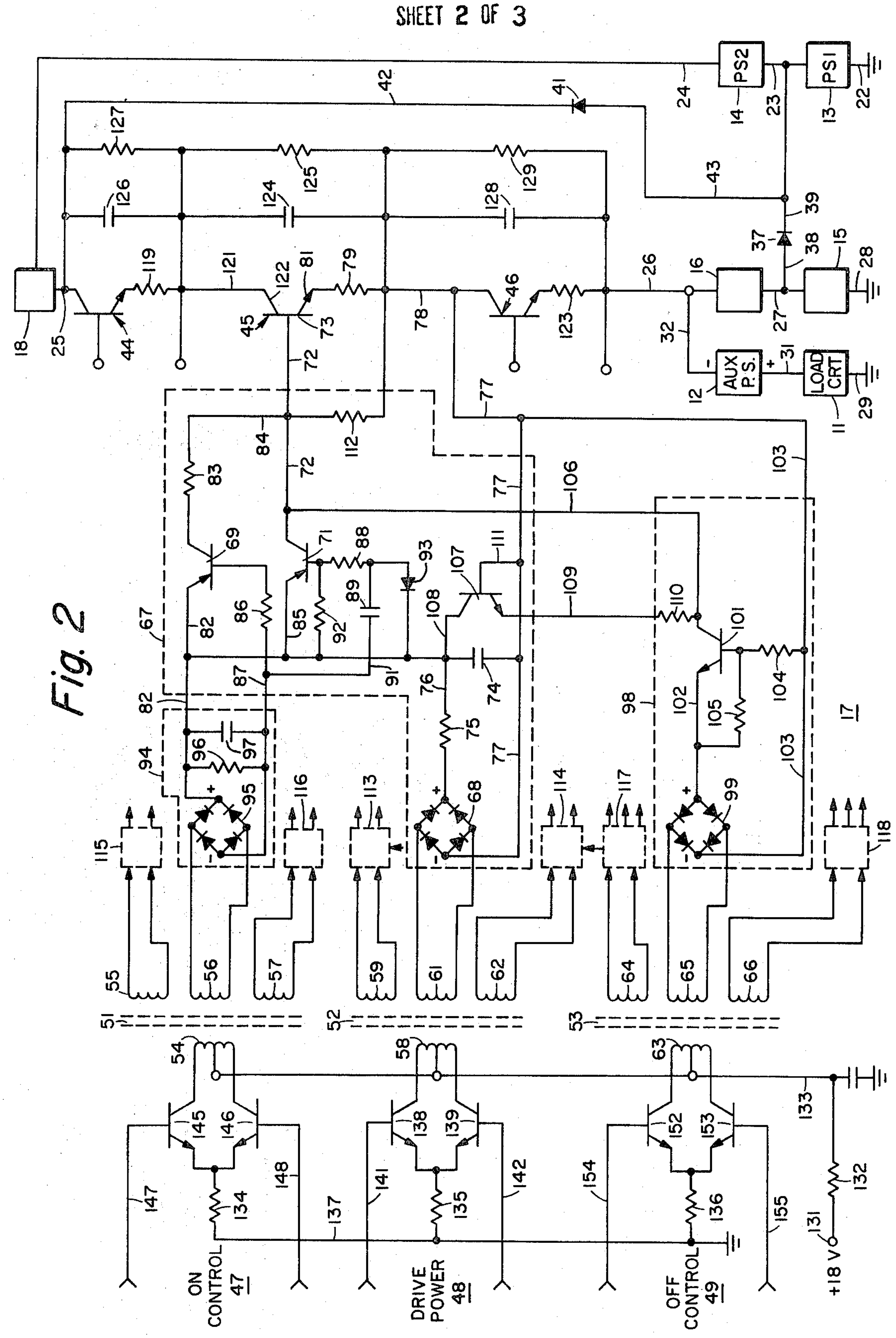
FIG. 2 is a circuit diagram illustrating the system and one component of the circuit shown in FIG. 1.

Referring to FIG. 2, the switch section 17 is shown as comprising three NPN transistors 44, 45 and 46 connected in series with each other between conductors 25 and 26, an "on" control 47, a drive power 48, and an "off" control 49 for the said transistors together with the circuitry connecting the respective components as will be described. Three transistors 44, 45, 46 have been shown by way of example only, it being understood that any number of transistors may be connected together in series in order to stand off the necessary voltage. In FIG. 2, the load, the other switch sections and the power supplies are shown for a clearer understanding of the invention. In a particular example wherein the switch section 17 was intended to withstand 3 KV. each one of the transistors 44, 45 and 46 was capable of withstanding over 1 KV. under low base impedance conditions.

"On" control voltage (47) is supplied through transformer 51, drive power (48) is supplied through transformer 52 and "off" control voltage (49) is supplied through transformer 53. Each transformer has one primary winding and three independent secondary windings so that each one of the transistors 44, 45 and 46 has its own "on" control power, its own drive power, and its own "off" control power. Unwanted coupling between circuits is thus avoided. High voltage isolation of the control circuits is also achieved. In FIG. 2 the complete circuitry is shown for one of the transistors only, namely transistor 45. The others, indicated diagrammatically, are identical to the one for transistor 45. Thus transformer 51 has a primary winding 54 and three independent secondary windings 55, 56 and 57 of which the circuitry extending from secondary winding 56 only is shown. Similarly, transformer 52 has a primary winding 58 and independent secondary windings 59, 61 and 62 of which the circuitry extending from the secondary winding 61 only is shown, the circuitry extending from the other secondary windings being identical. Also, similarly, the transformer 53 has a primary winding 63 and independent secondary windings 64, 65 and 66 of which the circuitry connected to the secondary winding 65 only is shown. The circuitry connected to the secondary windings 64 and 66 is similar to that connected to secondary winding 65.

The drive power circuit for switching transistor 45 will be described first. This drive power circuit is designated by the reference character 67 shown as a broken line outline surrounding a full wave rectifier 68, PNP transistors 69 and 71, and certain other components to be designated, and supplies base current through conductor 72 to the base 73 of transistor 45. The rectifier 68 has its input terminals connected to the secondary winding 61 of transformer 52 and has its output terminals connected to a capacitor 74 through a resistor 75. The terminals of capacitor 74 are connected to conductors 76 and 77, the conductor 77 being connected through conductor 78 to resistor 79 and thus to the emitter 81 of transistor 45. The conductor 76 is connected by way of conductor 82 to the emitter of transistor 69 the collector of which is connected by way of a resistor 83 and conductor 84 to conductor 72 and thus to the base of transistor 45. The conductor 76 is also connected by way conductor 85 to the emitter of transistor 71 the collector of which is connected by way conductor 72 to the base 73 of transistor 45. Bias, or turn-on, current for the base of transistor 69 is supplied through a resistor 86 from conductor 87 as will be described. Bias, or turn-on, current for the base of transistor 71 is supplied by way of resistor 88 and capacitor 89 connected through conductor 91 to the conductor 87. For improved stability of transistor 71 a DC return resistor 92 is connected from the base of the transistor to the conductor 76 and thus to the emitter.

The emitter-collector circuit of transistor 69 and the emitter-collector circuit of transistor 71 are both connected by way of conductor 76 to the positive terminal of rectifier 68 and to the base 73 of transistor 45. Both of these emitter-collector circuits supply bias, or turn-on, current to the base 73 of transistor 45. Also both transistors 69 and 71 are turned on by the same turn-on voltage to be described and supplied to the bases thereof, respectively. But the emitter-collector circuit of transistor 69 has a resistor 83 therein which limits the current transistor 69 may supply to the base of transistor 45. In other words, the resistor 83 is, in effect, a high impedance in the emitter-collector circuit of transistor 69. On the other hand, the emitter-collector circuit of transistor 71 has no resistors in it for best operation and is of low impedance. Thus base current may be supplied through the emitter-collector circuit of transistor 71 to the base 73 of transistor 45 unimpeded, in effect.

So long as "on" control voltage is being supplied, the transistor 69 will be turned on through the bias circuits described. However, the transistor 71 will be turned on only initially and will gradually be turned off by its bias circuit comprising resistor 88 and capacitor 89. When "on" control voltage is first supplied, the base voltage to transistor 71 through capacitor 89 and resistor 88 is the same as that to the base of transistor 69 through the resistor 86, resistors 86 and 88 having the same value. However, capacitor 89 begins to charge and continues to charge under the turn-on voltage supplied until capacitor 89 is charged to a voltage at which point the reduced voltage supplied to the base of transistor 71 causes it to turn off and transistor 71 becomes nonconducting. Thus, while transistor 69 remains conducting after turn-on until the "on" control voltage is turned off, transistor 71 is conducting for only a relatively short time, for example, 25 microseconds in the particular application and is then turned off. The time constant of the timing circuit, resistor 88 and capacitor 89 may be changed as desired. Other timing devices or circuits may also be used. A diode 93 is connected from the common terminal of resistor 88 and capacitor 89 and conductor 76 to provide a discharge path for capacitor 89.

Whenever the circuit is energized, drive power 48 is connected and functioning and the capacitor 74 is charged at all times through the circuit described including the resistor 75. Thus, whenever a turn-on or on control signal comes to transistors 69 and 71, the capacitor 74 can discharge through the emitter-collector circuit of transistor 71 by virtue of there being little or no impedance in this circuit. Hence large currents are supplied to the base 73 of transistor 45 and transistor 45 is therefore, in effect, turned on "hard." Consequently, the capacitance C of load 11 may be rapidly charged through transistor 45 and the other series transistors. This "hard" turn on continues so long as the timing circuit comprising resistor 88 and capacitor 89 maintains transistor 71 in a conducting condition. When transistor 71 ceases conducting by virtue of the functioning of the timing circuit, the transistor 69 continues to conduct at its relatively low current, due to resistor 83, and because the voltage is continuously applied to its emitter through conductors 82 and 76 and resistor 75 to rectifier 68. The latter current is a much lower current and provides, in effect, an idling drive for transistor 45 to enable the load circuit to function normally at the constant voltage.

The "on" control circuit for transistor 45 will now be described. The turn-on circuit for transistors 69 and 71 is identified by the reference character 94 applied to the broken line box within which are shown a full wave rectifier 95, a resistor 96 and a capacitor 97. The resistor and capacitor 96 and 97, respectively, are connected across the output terminals of the rectifier and its input terminals are connected across the secondary winding 56 of the transformer 51. The capacitor 97 functions essentially as a filter for the DC voltage of rectifier 95 before its application to the emitter-base circuits of transistors 69 and 71 while the resistor 96 functions essentially to provide a discharge path for the capacitor 89 through diode 93. The turn-on control circuit 94 develops its voltage whenever the on control 47 is energized as will be described.

The "off" control circuit for transistor 45 will now be described. Transistor 45 is turned off by energizing the "off" control 49 simultaneously with deenergization of the "on" signal by on control 47. The turn-off circuitry is designated by the broken line rectangle 98 and comprises a full wave rectifier 99 and an NPN transistor 101. The input terminals of rectifier 99 are connected to the secondary winding 65 and the output terminals are connected by way of conductor 102 to the emitter of transistor 101 and by way of conductor 103 and resistor 104 to the base of transistor 101. A bias resistor 105 is connected across the base and emitter of transistor 101. The conductors 103 is connected to the conductor 77 and 78 and thus to the resistor 79 and the emitter 81 of transistor 45, and the collector of transistor 101 is connected through a conductor 106 to conductor 72 and thus to the base 73 of transistor 45. The diodes of rectifier 99 are of a polarity to apply a negative voltage to the emitter of transistor 101. Thus through the conductors 106 and 103 a negative voltage is applied to the base 73 of transistor 45 whenever the turnoff signal is applied. The full negative voltage of the turn-off control 98 (typically 5 volts or less) is applied to the base 73 and thus transistor 45 is biased "off," and is held in its off condition irrespective of transient turn-on voltages which may exist in the circuit. The turn-off voltage is maintained until the "off" control signal is removed at 49.

During the off period of transistor 45 as effected by the turn-off control, the drive power 48 remains energized as previously indicated and therefore capacitor 74 continues to receive charge. To prevent this charge from exceeding the normal charge that capacitor 74 is intended to have an NPN transistor 107 has its emitter-collector circuit connected across the capacitor 74 by way of conductor 108, conductor 109, resistor 110, conductors 106 and 72, base-emitter circuit of transistor 45, resistor 79, and conductors 78 and 77 to the other terminal of the capacitor 74. The resistor 110 having a value the same as resistor 83, the load across capacitor 74 during the off condition is essentially the same as the load imposed across capacitor 74 by the transistor 69 and its circuitry during the on condition. Accordingly the voltage on capacitor 74 does not build up beyond that for normal operation. The base of transistor 107 is connected by way of conductor 111 to conductor 77. The transistor 107 is turned on only when the turn-off circuit 98 is energized.

As indicated hereinbefore the transistors 44, 45 and 46 function to stand off the high voltage better when their base impedances are relatively low. Thus resistor 112 connected between the base 73 and the emitter 81 of transistor 45 has a relatively low value such, for example, as about 330 ohms. The resistor 79, in the emitter circuit of transistor 45, had in the particular case a value of nominally 1.2 ohms. Its purpose is to equalize the initial current surge through the switch elements and can be varied to control the switching speed through control of the charge or discharge current for load 11.

Similarly to the circuits described the drive power circuit shown by the dotted rectangle 113 supplies drive power to the transistor 44, the drive power circuit shown by the dotted rectangle 114 supplies drive power to the transistor 46, the turn-on control circuit shown by the dotted rectangle 115 supplies turn-on power to transistor 44 and the turn-on control circuit shown by the dotted rectangle 116 supplies turn-on power for the transistor 46, the off control circuit shown by the dotted rectangle 117 supplies turn-off power to the transistor 44 and the off control circuit shown by the dotted rectangle 118 supplies turn-off power for the transistor 46 all as described in connection with the transistor 45. Connected in series with the emitter of transistor 44 is a resistor 119 also connected to the conductor 121 and thus to the collector 122 of transistor 45. The emitter of transistor 46 has a resistor 123 connected to it and to the conductor 26, and the collector of transistor 46 is connected to conductor 78 to complete the series circuit of the emitter-collector circuits of transistors 44, 45 and 46. The magnitude of resistor 123 is of the same value as that of resistors 79 and 119.

Connected in parallel across the emitter and collector of transistor 45 are a capacitor 124 and a resistor 125. Similarly a capacitor 126 and resistor 127 are connected in parallel across the emitter and collector of transistor 44 and a capacitor 128 and resistor 129 are connected in parallel across the emitter and collector of transistor 46. These parallel circuits are in order to balance the voltages across the emitter-collector circuits of transistors 44, 45 and 46, thereby reducing effects of normal variations in the parameters of these transistors.

Figure 3:
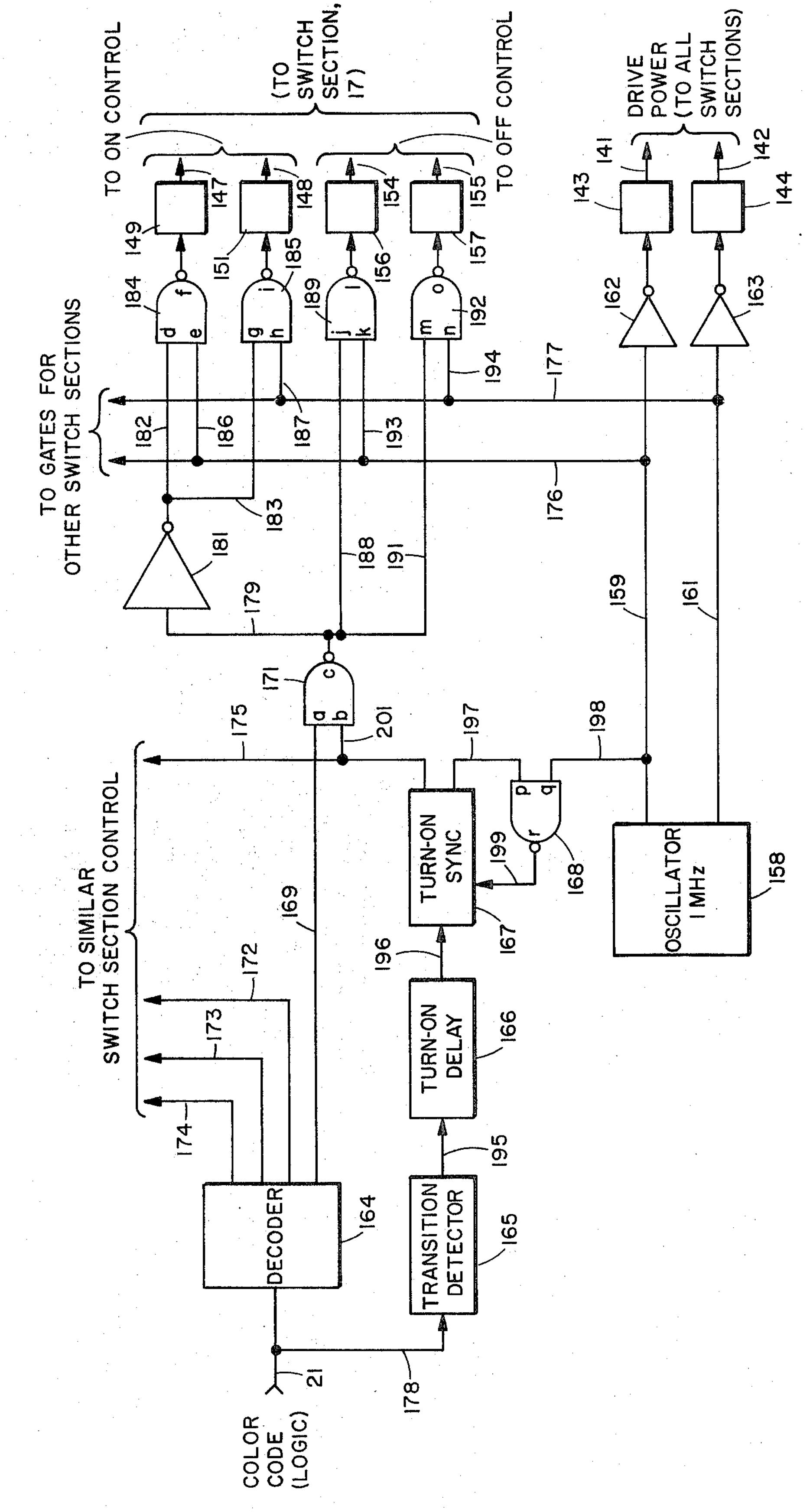
FIG. 3 is a circuit diagram showing one form of control circuitry according to the invention.

Referring now to FIGS. 2 and 3, the control circuitry may be described for supplying the "on" control signals, the drive power signals and the "off" control signals to the circuitry of switch section 17.

The primary windings 54, 58 and 63 of transformers 51, 52 and 53 are supplied power from a DC source 131 which may be 18 volts, for example, the circuit extending through a resistor 132, a conductor 133 to the midpoints of each of the primary windings, through transistors connected in push-pull to the ends of each of the primary windings and through resistors 134, 135 and 136 respectivaly and conductor 137 to ground. Push-pull transistors 138 and 139 of drive power circuit 48 have their bases connected through conductors 141 and 142 respectively to correspondingly numbered conductors extending from gates 143 and 144 (FIG. 3) which may be of the transistor variety as is well understood. Push-pull transistors 145 and 146 of the on control circuit 47 have their bases connected, respectively, by conductors 147 and 148 extending from outputs, or gates, 149 and 151 which also may be of the transistor variety. The push-pull transistors 152 and 153 of the off control circuit 49 have their bases connected by means of conductors 154 and 155, respectively, to correspondingly numbered conductors extending from gates 156 and 157 (FIG. 3). It will be understood that the other switch sections 15, 16 and 18 will have corresponding transformer energization circuits which will be energized from gate structures as shown in FIG. 3.

The basic frequency of operation is determined by the oscillator 158 shown as generating a frequency of 1 MHz and supplying its signal over conductors 159 and 161 to inverters 162 and 163 and thus to the gates 143 and 144. The gates 143 and 144 are opened on alternate half cycles of the oscillator signal which is ideally a square wave and accordingly turn on the transistors 138 and 139 on alternate half cycles thereby generating a frequency in the secondary windings 59, 61 and 62 of 1 MHz. It will be noted that the circuit from oscillator 158 is continuous through the inverters 162, 163, and gates 143, 144 to the bases of transistors 138 and 139. Accordingly, drive power is on at all times whenever the circuit is energized. It will also be noted that the drive power goes to all switch sections.

The oscillator 158 includes such circuitry as will be understood to generate high state and low state (logical "1"s and logical "0"s) on conductor 159 which logical "1"s and logical "0"s correspond to positive and negative half-waves of square wave oscillations. Correspondingly the circuitry generates on conductor 161 the complement of the signal on conductor 159, that is when the signal on conductor 159 is a logical "1" the signal on conductor 161 is a logical "0" and vice versa.

Comparing FIG. 1 and 3 it will be noted that the color code signals come in on conductor 21 and pass to a switch control circuit 19. While only one conductor 21 is shown, it will be understood that this is diagrammatic and that conductor 21 will actually be at least two conductors. From control circuit 19 the appropriate turn-on or turn-off signals pass over conductors 33, 34, 35 and 36 to the respective ones of the switch sections 15, 16, 17 and 18. For proper correlation of the conductors, block diagram units etc. of FIGS. 1, 2 and 3 to have consistent use of the reference characters, it will be understood that conductor 35 of FIG. 1 corresponds to conductors 141, 142, 147, 148, 154, 155, of FIG. 2 and conductor 169 of FIG. 3. Similarly for conductors 33, 34 and 41. With the exception of the oscillator 158, the decoder 164, the transition detector 165, the turn on delay circuit 166, the turn-on synchronizer 167 and the NAND Gate 168 which apply to all switch sections, the circuit components of FIG. 3 apply to the control of switch section 17 alone as shown in FIG. 2. The control circuit of FIG. 3 will be described specifically in connection with the operation of switch section 17 (FIG. 2) but it will be understood that similar control circuits function with respect to the other switch sections, initiation of their operations being determined by the output signal from the decoder 164.

Thus the output signal from decoder 164 which passes over conductor 169 to NAND gate 171 corresponds in part to conductor 35 (FIG. 1) and assists in the control of the operation of switch section 17. Similarly the conductor 172 corresponds in part to conductor 33 (FIG. 1) and assists in the control of switch section 15, conductor 173 corresponds in part to conductor 34 (FIG. 1) and assists in the control of switch section 16, and conductor 174 corresponds in part to conductor 36 (FIG. 1) and assists in the control of switch section 18. The conductor 175 coming from the turn-on synchronizer 167 also passes to each of the other switch section controls and to a gate corresponding to gate 171 for each of those sections. Similarly the conductors 176 and 177 connect respectively to the conductors 159 and 161 and thus transmit the output logical "1"s and logical "0"s from oscillator 158 to each of the other switch section controls.

The structure and operation of the control shown in FIG. 3 may be understood by considering a typical state of operation in connection with FIGS. 2 and 3. Thus it may be supposed that the color code signal on conductors 21 has been received and decoder 164 has indicated that the switch section 17, among others, is to be turned on. Some will be turned off. To turn on section 17 an appropriate signal, for example a high state or logical "1," has been transmitted over conductor 169 to the terminal *a* of NAND gate 171. As will be explained, the signal at *b* terminal of NAND gate 171 also is a logical "1." Under these conditions, in accordance with the customary truth table for NAND gates, the output signal at terminal *c* is a logical "0" which is a turn-on signal.

Since the circuits have been energized, drive power is being supplied from the transistor output controls 143 and 144 of FIG. 3 over conductors 141 and 142 to the bases of transistors 138 and 139. Accordingly power is being generated and the drive power circuit 48 of switch circuit 17 (FIG. 2) is operating a already described. Also, since switch section 17 is turned on the "on" control 47 is turned on and the "off" control 49 is turned off. Thus the transistor output control circuits 149 and 151 (FIG. 3) are supplying appropriate energization to the bases of transistors 145 and 146 so that these transistors conduct to energize the "on" control. Likewise since the "off" control 49 is off the transistor controls 156 and 157 are not causing energization of transistors 152 and 153 and the "off" control 49 is off. The turn-on of "on" control 47 occurs as follows: The logical "0" signal from terminal *c* of NAND gate 171 passing over conductor 179 to the inverter 181 becomes a logical "1" at this point and is so transmitted over conductors 182 and 183 to the *d* and *g* terminals respectively of the NAND gates 184 and 185, thus enabling these gates.

The input to the other terminal *e* of NAND gate 184 is received over conductor 186 and conductors 176 and 159 from oscillator 158. Similarly the other terminal *h* of NAND gate 185 is received over conductor 187 and conductors 177 and 161 from oscillator 158. So long as the color code signal commands switch section 17 to remain closed, the signals at terminals *d* and *g* of NAND gates 184 and 185 will remain in their logical "1" or high states. The other inputs at terminals *e* and *h* of NAND gates 184 and 185 will alternate between high state and low state (logical "1" and logical "0") as the signals change states at the output of oscillator 158.

The terminal e of NAND GATE 184 will have a high state or logical "1" signal when the terminal *h* of the gate 185 will have a low state or logical "0" signal and vice versa. Thus the outputs of NAND gates 184 and 185, at *f* and *i* respectively, will change from logical "0" to logical "1" and vice versa in accordance with the oscillator signals, the signal at terminal *f* being a logical "0" when the signal at terminal *i* is a logical "1" and vice versa. By this form of energization of the transistor output circuits 149 and 151, the on control 47 causes the transistors 145 and 146 to develop in effect an alternating current in the primary 54 of transformer 51.

The turn-off of "off" control 49 occurs as follows: While the switch section 17 is in the state assumed, the logical "0" or low state signal at terminal *c* of NAND gate 171 is connected by a conductor 188 to the *j* terminal of NAND gate 189 and over conductor 191 to the *m* terminal of NAND gate 192. The other terminal *k* of NAND gate 189 is connected via conductor 193 to conductors 177 and 159 to oscillator 158, and the other terminal *n* of NAND gate 192 is connected via conductor 194 through conductors 177 and 161 to oscillator 158. Under the assumed condition, then, the *j* and *m* terminals of NAND gates 189 and 192 having "0" state signals thereon, and the *k* and *n* terminals oscillating between logical "1"s and logical "0"s in accordance with the variation of signals at the output of the oscillator, will leave the outputs at terminals *l* and *o* of NAND gates 189 and 192 respectively logical "1"s, or high state, in accordance with the customary truth table for NAND gates. The high state signals at terminals *l* and *o* are transmitted to the transistor output control circuits 156 and 157 which function over conductors 154 and 155 to bias the transistors 152 and 153 to an off condition.

Accordingly, as described the switch section 17 has gone through its starting condition and now remains on for continuous operation as has been previously described. The heavy charge of discharge current of the load C has passed through transistors 44, 45 and 46. The transistor 71 is non-conducting and only the steady state bias current to the base of transistors 44, 45 and 46 through transistor 69 is flowing. The drive power lost is thus much reduced and efficiency increased, while permitting more rapid turn off of the switching transistors as well.

The turn-on signal of logical "0" at terminal *c* of NAND gate 171 was delayed in coming "on" for an interval of nominally 2 microseconds as follows: When the color code signal to turn on switch section 17 appeared on conductors 21, it was decoded by decoder 164 and transmitted over conductor 169 to the a terminal of NAND gate 171 as a logical "1." The same color code signal was transmitted over conductor 178 to the transition detector 165, which may be a multiple differentiating circuit. The change in the incoming signal was detected by transition detector 165 which supplies a signal to this effect over conductor 195 to the turn-on delay circuit 166, which may be a monostable multivibrator circuit of well-known variety. From the instant of transition to the end the turn-on delay time of nominally 2 microseconds, the turn-on delay signal is applied via conductor 196, turn-on synchronizing circuit 167, and conductors 175 and 201 to terminal b of NAND gate 171 as a logical "0," disabling the latter and enforcing a "1" at its output terminal *c*, and turning "off" the associated switch section. At the end of the nominal turn-on delay period of 2 microseconds as determined by turn-on delay circuit 166, turn-on is further inhibited by turn-on synchronizer 167 and NAND gate 168 until the signal from oscillator 158 is rising on conductor 159, thus effectively synchronizing the turn-on and oscillator signals. The turn-on synchronization occurs as follows: At the initiation of turn-on delay, the turn-on synchronizer 167 is "set" to that condition which applies the logical "0" to terminal *b* of NAND gate 171, and logical "1" to terminal *p* of NAND gate 168. Two conditions are required to "reset" turn-on synchronizing circuit 167 and terminate the delay period: (1) the turn-on delay signal of 2 microseconds duration on conductor 196 must have expired, and (2) a transition from logical "1" to logical "0" must occur at terminal *r* of NAND gate 168. The latter condition is met when the oscillator signal at terminal *g* of NAND gate 168 goes from logical "0" to logical "1," since terminal *p* of NAND gate 168 has previously been set to logical "1" as described above. When the delay period is terminated as described above, terminal *b* of NAND gate 171 goes to logical "1" via conductors 175 and 201, and gate 171 is thus enabled for turn-on. The turn-on delay signal from turn-on delay circuit 166 enables the stored charge in the transistors 44, 45 and 46 to decay so that these transistors are fully "off" prior to turn-on of any switch section.

In addition, the turn on synchronizing circuit 167, by virtue of NAND gate 168, causes the turn-on signal to come through the NAND gate 171 in fixed phase with the rising or leading edge of the oscillator 158 signal. The effect of synchronizing the turn-on with the oscillator signal is to insure that turn-on does not occur during transitions of the oscillator 158 signal, which can result in excessive variation in initial drive power to the various transistors due to minute differences in circuit characteristics, i.e., speed, delay, and gain. It is essential that all transistors be driven in unison.

Whenever a signal comes to change the voltage condition of the load, that is, to change the "on" or "off" condition of any of the switching sections, all of the switch sections are turned off for a time interval of nominally 2 microseconds before any are turned on, even though a section which is "on" may revert to the "on" state after the transistion. The turn-off signal is transmitted without significant delay to both terminals *a* and *b* of those NAND gates 171 of the switch sections which are to be turned "off," and to terminal *b* only of those which are to be "on." the turn-off signal is therefore a logical "0" or a logical "1" at either terminal *a* and *b* or logical "0" at both terminals *a* and *b*. The turn-on signal has already been described for switch section 17 and applies to all other switch sections.

When the "off" signal which is a high state or logical "0" comes over conductor 169, a logical "1" signal appears at terminal *c* which is inverted by inverter 181 and transmitted as a logical "0" to terminals *d* and *g* of NAND gate 184 and 185. Accordingly these gates develop logical "1"s at their output terminals *f* and *i*, to turn "off" the on-control 47. At the same time the logical "1" signal from terminal *c* of NAND gate 171 is transmitted to the *j* and *m* terminals of NAND gates 189 and 192, whereby these gates are enabled and develop at their output terminals *l* and *o*, respectively, logical "0"s and logical "1"s, and vice versa, on successive half cycles of the oscillator thereby turning "on" the off-control 49 through the circuitry described by biasing the transistors 44, 45 and 46 to an "off" condition.

Operation of the complete system, vis-a-vis, FIG. 1 may now be further considered.

The switch conditions for three voltage levels are as follows:

| Voltage Level | Switch Condition OFF | ON |
|---|---|---|
| Low | 17 and 18 | 15 and 16 |
| Intermediate | 15 and 18 | 16 and 17 |
| High | 15 and 16 | 17 and 18 |

Referring to FIG. 1, it will be noted that, and as indicated in this specification, when the switch sections 17 and 18 are on and the switch sections 15 and 16 are off the voltages of power supplies 13, 14 and 12 are connected in series to give for example, 12 KV. across the load. This is the high level upon the assumption that all of the circuits are functioning in accordance with this voltage level and the color code then calls for switching the voltage from 12 KV. to 6 KV., the first step in that sequence would be for the decoder to place a logical "0" signal on terminal *a* of the gates 171 whose switch sections are to turn off (namely 17 and 18) and a logical "1" on terminal *a* of the gates 171 whose switch sections are to turn on (namely 15 and 16). This turns off the on control circuits 47 for switch sections 17 and 18 and turns on the "off" control circuits 49 for the same switch sections as has been described already. It also turns on the "on" control switch sections 15 and 16 and turns off the off control of these same switches, also as already described. The switch sections 15 and 16 are delayed from coming on for the short delay period of nominally 2 microseconds by their turn-on delay circuits as described. During this period the charge stored in the switching transistors of switch sections 17 and 18 is permitted to decay thereby preventing short circuiting of the power supplies 13 and 14 upon turn-on of switch sections 15 and 16 following that delay when a logical "1" appears at terminal *b* of gate 171. That is to say, while there is still charge stored in the switching transistors, switch sections 17 and 18 would remain partially on for that interval of 1 to 5 microseconds until the charge stored has decayed. Thus if the switch sections 15 and 16 are initially turned on by the control circuitry without the delay and switch sections 17 and 20 are still on, in effect, because the stored charge has not decayed, then the power supplies 13 and 14 are short circuited to ground through switch sections 18, 17, 16 and 15. However, because of the short delay interval the stored charge in switch sections 17 and 18 has decayed and when the subsequent turn-on signal for switch sections 15 and 16 comes, the switch sections 17 and 18 are in fact open.

When the switch sections 15 and 16 are turned "on," the excess voltage of 6 KV. on load 11 (capacitor c) begins to decrease as current flows off through the switching transistors of switch sections 15 and 16 which are in their hard "on" mode as described in connection with the transistors 44, 45 and 46 of switch section 17. After the hard "on" period the switch sections 15 and 16 function with normal or idling base current as described in connection with switch section 17.

A similar situation would occur if the switching were to take place from low state 6 KV. to high state or 12 KV. Under this condition, switch sections 15 and 16 which were closed and therefore have stored charge would be turned off while switch sections 17 and 18 would, after 1 to 5 microseconds, be turned on. If stored charge remained in the switch sections 15 and 16 when the switch sections 17 and 18 are turned on there would be a short circuit of the power supplies 13 and 14 as already referred to.

Assume now that the system is functioning and the color code commands change to the intermediate level of 9 KV. from the high level of 12 KV. At 12 KV. switch sections 17 and 18 are on, and switch sections 15 and 16 are off through circuits already described. The 9 KV. color code command utlimately causes switch sections 15 and 18 to be off and switch sections 16 and 17 to be on. This occurs by virtue of the appearance of logical "0"s at the a terminals of NAND gates 171 of switch sections 15 and 18 and logical "1"s at the a terminals of NAND gates 171 of switch sections 16 and 17. There is a delay in the closing of switch sections 16 and 17 as explained in connection with switch section 17.

After the 1–5 microsecond time delay and switch sections 16 and 17 are on and switch sections 15 and 18 are off, the excess of 3 KV. on the load 11 (capacitor 11) is discharged through the circuit extending from ground through conductor 29, the load 11, power supply 12, conductors 32 and 26, switch section 16, conductors 27 and 38, diode 37, conductors 39 and 23, power supply 13 and conductor 22 to ground. Thus the diode 37 serves to provide a discharge circuit for the load capacitance on voltage pull down from 12 KV. to 9 KV. If the voltage level were to change from 9 KV. to 12 KV., switch sections 15 and 16 would be turned off and sections 17 and 18 turned on, whereby load 11 would be charged to 12 KV. through the circuit extending from ground through conductor 29, load 11, power supply 12, conductors 32 and 26, switch section 17, conductor 25, switch section 18, conductor 24, power supply 14, conductor 23, power supply 13, and conductor 22 to ground. From the examples given, the operative steps for other changes in voltage will be understood without specific description thereof.

The time delay to permit the decay of stored charge assures that all switch sections are turned off momentarily before any are turned on.

While NPN and PNP transistors have been shown in specific locations, it will be understood that either type may be used depending on the particular conditions.

The logic of FIG. 3 is one form of operable logic. Other forms may be used to meet the requirements of particular situations.

Table of Typical Resistor and Capacitor Values according to reference characters:

| Resistors No. | Value | Capacitors No. | Value |
|---|---|---|---|
| 75 | 33 ohms | 89 | 4,700 P.F. |
| 79 | 1.2 ohms | 97 | 2,200 P.F. |
| 83 | 1 K ohms | 124 | 680 P.F. |
| 86 | 5.6K ohms | 126 | 680 P.F. |
| 88 | 5.6K ohms | 128 | 680 P.F. |
| 92 | 10.0K ohms | | |
| 96 | 180 ohms | | |
| 104 | 1.0K ohms | | |
| 105 | 10 K ohms | | |
| 109 | 1 K ohms | | |
| 119 | 1.2 ohms | | |
| 123 | 1.2 ohms | | |
| 125 | 1 MΩ ohms | | |
| 127 | 1 MΩ ohms | | |
| 129 | 1 MΩ ohms | | |
| 134 | 33 ohms | | |
| 135 | 33 ohms | | |
| 136 | 33 ohms | | |

I claim:

1. A control circuit for a transistor connected to a substantially capacitive load, such transistor having an emitter, a collector and a base, comprising:

first means including timing means for providing a hard drive bias current to said base for a predetermined time while charging said capacitive load and for providing an idle drive bias current to said base after said predetermined time, second means independent of said first means for controlling said first means, and third means independent of said first and said second means for providing a positively acting off bias voltage to said base.

2. The control circuit according to claim 1 wherein said timing means comprises an RC circuit.

3. The control circuit according to claim 1 wherein said first means includes a capacitor maintainable in a predetermined state of charge and a low impedance connection from said capacitor to said base.

4. In an on-off switching circuit for a plurality of series connected switching transistors connecting an essentially capacitive load to a voltage source having a voltage higher than the blocking voltage of each of said plurality of switching transistors, each of said switching transistors having an emitter, a collector, and a base, control means for said plurality of switching transistors comprising:

first means including timing means individual to each of said switching transistors for simultaneously providing a hard drive bias current to the base of each of said transistors for a predetermined time after a turn-on signal, while charging said capacitive load and for simultaneously providing an idle drive bias current to the base electrode of each of said switching transistors after said predetermined time, second means individual to each of said switching transistors and independent of said first means for controlling said first means, and third means individual to each of said switching transistors and independent of said first and said second means for simultaneously providing after a signal therefor a positively acting off bias voltage to the base of each of said switching transistors.

5. The control circuit according to claim 4 wherein said timing means comprises an RC circuit.

6. The control circuit according to claim 4 wherein said first means comprises, for each switching transistor, a capacitor maintainable in a predetermined state of charge, a first source of current for charging said capacitor, a low impedance circuit between said capacitor and the base of the switching transistor, and a relatively high impedance circuit between said first source of current and the base of the switching transistor.

7. The control circuit according to claim 6 wherein said low impedance circuit comprises a second transistor whose emitter-collector circuit is connected between the capacitor and the base of the switching transistor, the base of said second transistor receiving said turn-on signal and being responsive to said timing means.

8. The control circuit according to claim 7 wherein the timing means comprises an RC circuit.

9 . The control circuit according to claim 6 wherein said relatively high impedance circuit comprises a third transistor whose emitter-collector circuit is connected between one terminal of said source of current and the base of said switching transistor and whose base receives said turn-on signal, and a relatively high impedance means connected in the emitter-collector circuit of said third transistor.

10. The control circuit according to claim 9 wherein said high impedance means comprises a resistance means.

11. The control circuit according to claim 9 wherein said second means comprises for each of said switching transistors a second source of current and circuit means connecting said second source of current to the bases of said second and said third transistors.

12. The control circuit according to claim 4 wherein said first means comprises for each switching transistor, a capacitor maintainable in a predetermined state of charge, a first source of current for charging said capacitor, a second transistor whose emitter-collector circuit is connected in a low impedance circuit between said capacitor and the base of said switching transistor, and a third transistor whose emitter-collector circuit is connected in a relatively high impedance circuit between one terminal of said first source of current and the base of said switching transistor; and said second means comprises for each of said switching transistors respectively, a second source of current, the base of said second transistor being connected to said second source of current for providing a turn-on signal for said second transistor, timing means connected to the base of said second transistor, the base of said third transistor being connected to said second source of current for providing a turn-on signal for said third transistor, and a relatively high impedance connected in the emitter-collector circuit of said third transistor.

13. The control circuit according to claim 12 wherein said timing circuit comprises an RC circuit having a predetermined time constant.

14. The control circuit according to claim 12 wherein the third means individual to each of said switching transistors and independent of said first and said second means for simultaneously providing, after a signal therefor, an "off" voltage to the base of each said switching transistors comprises, for each of said switching transistors, respectively, a third source of current, and a fourth transistor whose emitter-collector circuit is connected in a relatively low impedance circuit with the base of said switching transistor and one terminal of said third source of current, and whose base is connected to the other terminal of said third source of current.

15. The control circuit according to claim 14 wherein the circuit of the capacitor of said first means includes means for limiting the charge accumulatable thereon.

16. The control circuit according to claim 15 wherein said charge limiting means comprises a fifth transistor whose emitter-collector circuit is connected in a relatively high impedance circuit with said capacitor and whose base is connected to one terminal of said capacitor for supplying a control voltage.

17. The control circuit according to claim 16 wherein the relatively high impedance on the emitter-collector circuit of said fifth transistor is essentially the same as that of said third transistor.

18. The control circuit according to claim 4 wherein, for each switching transistor, the first means, second means and third means include separate transformers each having a primary winding and at least one secondary winding and the first, second and third current sources each include rectifier means connected, respectively, to the secondary windings of said transformers.

19. A transistor switch structure comprising:

a plurality of series connected switching transistors for connecting a substantially capacitive load to a current source whose voltage exceeds the blocking voltage of each of said plurality of switching transistors, each of said switching transistors having an emitter, a collector, and a base;

first means including timing means individual to each of said switching transistors for simultaneously providing a hard drive bias current to the base electrode of each of said switching transistors for a predetermined time after a turn-on signal, while charging said capacitive load and an idle drive bias current to the base electrode of each of said switching transistors after said predetermined time;

second means individual to each of said switching transistors and independent of said first means for controlling said first means; and third means individual to each of said switching transistors and independent of said first and said second means for simultaneously providing, after a signal therefor, a positively acting off bias voltage to the base of each of said switching transistors.

20. The transistor switch structure according to claim 19 wherein:

said first means comprises, for each switching transistor, a capacitor maintainable in a predetermined state of charge, a first source of current for charging said capacitor, a second transistor whose emitter-collector circuit is connected between the capacitor and the base of the switching transistor, the base of said second transistor receiving said turn-on signal and being responsive to said timing means, a third transistor whose emitter-collector circuit is connected between one terminal of said first source of current and the base of said switching transistor, the base of said third transistor being connected to the other terminal of said first source of current, and a relatively high resistance means connected in the emitter-collector circuit of said third transistor;

said second means comprises for each of said switching transistors respectively, a second source of current, the base of said second transistor being connected to said second source of current for providing a turn-on signal for said second transistor, timing means connected to the base of said first transistor;

the base of said third transistor being connected to said second source of current for providing a turn-on signal for said third transistor, and a relatively high impedance connected in the emitter-collector circuit of said third transistor, and said third means comprises, for each of said switching transistors, respectively, a third source of current, and a fourth transistor whose emitter-collector circuit is connected in a relatively low impedance circuit with the base of said switching transistor and one terminal of said third source of current, and whose base is connected to the other terminal of said third source of current.

21. A switching circuit for connecting and disconnecting one or more of more than one voltage sources to an essentially capacitive load comprising:

a series of transistor switch sections, the switching transistors of which have a blocking voltage less than the voltage of one of said current sources;

first control means for selecting a predetermined number of switch sections of said series and closing the same to effect connecting the correlated number of said voltage sources through said switch sections to said load, and further control means cooperating with said first control means for opening the remaining ones of said switch sections prior to said closing.

22. The switching circuit according to claim 21 wherein each one of said series of switch sections comprises:

a plurality of series connected switching transistors for connecting an essentially capacitive load to a current source whose voltage exceeds the blocking voltage of each of said plurality of switching transistors, each of said switching transistors having an emitter, a collector, and a base, first means including timing means individual to each of said switching transistors for simultaneously providing a hard drive bias current to the base electrode of each of said transistors for a predetermined time after a turn-on signal, while charging said capacitive load and for simultaneously providing an idle drive bias current to the base electrode of each of said switching transistors after said predetermined time, second means individual to each of said switching transistors and independent of said first means for controlling said first means, and third means individual to each of said switching transistors and independent of said first and said second means for simultaneously providing after a signal therefor a positively acting off bias voltage to the base of each of said switching transistors.

23. The switching circuit according to claim 22 wherein each one of said series of switch sections comprises:

a capacitor maintainable in a predetermined state of charge, a first source of current for charging said capacitor, a second transistor whose emitter-collector circuit is connected between the capacitor and the base of the switching transistor, the base of said second transistor receiving said turn-on signal and being responsive to said timing means, a third transistor whose emitter-collector circuit is connected between one terminal of said first source of current and the base of said switching transistor, the base of said third transistor being adapted to receive said turn-on signal, and high resistance means connected in the emitter-collector circuit of said third transistor;

said second means comprises, for each of said switching transistors respectively, a second source of current;

the base of said second transistor being connected to said second source of current for providing said turn-on signal for said second transistor;

said timing means being connected to the base of said second transistor;

the base of said third transistor being connected to said second source of current for providing said turn-on signal and a relatively high impedance connected in the emitter-collector circuit of said third transistor; and said third means comprises, for each of said switching transistors respectively:

a third source of current, and a fourth transistor whose emitter-collector circuit is connected in a relatively low impedance circuit with the base of said switching transistor and one terminal of said third source of current, the base of said fourth transistor being adapted to be connected to the other terminal of said third source of current.

24. The switching structure according to claim 19 wherein for each switching transistor the first means, second means and third means include separate transformers each having a primary winding and at least one secondary winding and the first, second and third current sources each include a rectifier connected, respectively, to the secondary windings of said transformers.

* * * * *